US011741306B2

(12) United States Patent
Galley et al.

(10) Patent No.: US 11,741,306 B2
(45) Date of Patent: Aug. 29, 2023

(54) CONTROLLABLE GROUNDED TEXT GENERATION

(71) Applicant: Microsoft Technology Licensing, LLC, Redmond, WA (US)

(72) Inventors: Michel Galley, Seattle, WA (US); Christopher Brian Quirk, Seattle, WA (US); William Brennan Dolan, Kirkland, WA (US); Zeqiu Wu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 541 days.

(21) Appl. No.: 16/817,124

(22) Filed: Mar. 12, 2020

(65) Prior Publication Data

US 2021/0192140 A1  Jun. 24, 2021

Related U.S. Application Data

(60) Provisional application No. 62/950,009, filed on Dec. 18, 2019.

(51) Int. Cl.
*G06F 40/30* (2020.01)
*G06F 3/16* (2006.01)
*G06N 20/00* (2019.01)
*H04L 51/42* (2022.01)

(52) U.S. Cl.
CPC .............. *G06F 40/30* (2020.01); *G06F 3/167* (2013.01); *G06N 20/00* (2019.01); *H04L 51/42* (2022.05)

(58) Field of Classification Search
None
See application file for complete search history.

(56) References Cited

U.S. PATENT DOCUMENTS

| 11,442,992 B1* | 9/2022 | Moon ..................... G06N 3/049 |
| 2020/0184018 A1* | 6/2020 | Lal ........................ G06Q 10/107 |

OTHER PUBLICATIONS

Chen et al. ("Semantically Conditioned Dialog Response Generation via Hierarchical Disentangled Self-Attention" May 30, 2019) (Year: 2019).*
Sukhbaatar, et al., "End-To-End Memory Networks", In Journal of Advances in Neural Information Processing Systems, Dec. 7, 2015, 9 Pages.

(Continued)

*Primary Examiner* — Nafiz E Hoque
(74) *Attorney, Agent, or Firm* — Alleman Hall Creasman & Tuttle LLP

(57) ABSTRACT

A controllable grounded response generation framework includes a machine learning model, a grounding interface, and a control interface. The machine learning model is trained to output computer-generated text based on input text. The grounding interface is useable by the machine learning model to access a grounding source including information related to the input text. The control interface is useable by the machine learning model to recognize a control signal. The machine learning model is configured to include information from the grounding source in the computer-generated text and focus the computer-generated text based on the control signal.

20 Claims, 10 Drawing Sheets

(56) References Cited

OTHER PUBLICATIONS

Sun, et al., "The Feasibility of Embedding Based Automatic Evaluation for Single Document Summarization", In Proceedings of the Conference on Empirical Methods in Natural Language Processing, Nov. 3, 2019, pp. 1216-1221.
Sutskever, et al., "Sequence to Sequence Learning with Neural Networks", In Proceedings of the 27th International Conference on Neural Information Processing Systems, Dec. 8, 2014, 9 Pages.
Tang, et al., "Target-Guided Open-Domain Conversation", In Proceedings of the 57th Annual Meeting of the Association for Computational Linguistics, Jul. 28, 2019, pp. 5624-5634.
Vaswani, et al., "Attention Is All You Need", In Proceedings of the 31st Conference on Neural Information Processing Systems, Dec. 4, 2017, 11 Pages.
Vinyals, et al., "A Neural Conversational Model", In Proceedings of the 31st International Conference on Machine Learning, Jul. 6, 2015, 7 Pages.
Wen, et al., "Semantically Conditioned LSTM-Based Natural Language Generation for Spoken Dialogue Systems", In Proceedings of the Conference on Empirical Methods in Natural Language Processing, Sep. 17, 2015, pp. 1711-1721.
Yang, et al., "A Hybrid Retrieval-Generation Neural Conversation Model", In Repository of arXiv:1904.09068v1, Apr. 19, 2019, 11 Pages.
Yavuz, et al., "DeepCopy: Grounded Response Generation with Hierarchical Pointer Networks", In Proceedings of the 32nd Conference on Neural Information Processing Systems, Dec. 7, 2018, 10 Pages.
Yoshino, et al., "Dialog System Technology Challenge 7", In Repository of arXiv:1901.03461v1, Jan. 11, 2019, 10 Pages.
Young, et al., "Augmenting End-to-End Dialogue Systems with Commonsense Knowledge", In Proceedings of the 32nd AAAI Conference on Artificial Intelligence, Apr. 26, 2018, pp. 4970-4977.
Yu, et al., "QANet: Combining Local Convolution with Global Self-Attention for Reading Comprehension", In Proceedings of the 6th International Conference on Learning Representations, Apr. 30, 2018, 16 Pages.
Zellers, et al., "Defending Against Neural Fake News", In Repository of arXiv:1905.12616v2, Oct. 29, 2019, 21 Pages.
Zhang, et al., "Consistent Dialogue Generation with Self-Supervised Feature Learning", In Repository of arXiv:1903.057592, Mar. 27, 2019, 14 Pages.
Zhang, et al., "DialoGPT: Large-Scale Generative Pre-Training for Conversational Response Generation", In Repository of arXiv:1911.005361, Nov. 1, 2019, 10 Pages.
Zhang, et al., "Generating Informative and Diverse Conversational Responses via Adversarial Information Maximization", In Proceedings of the 32nd Conference on Neural Information Processing Systems, Dec. 3, 2018, 11 Pages.
Zhang, et al., "Personalizing Dialogue Agents: I Have a Dog, Do You Have Pets Too?", In Proceedings of the 56th Annual Meeting of the Association for Computational Linguistics, Jul. 15, 2018, pp. 2204-2213.
Zhao, et al., "Unsupervised Discrete Sentence Representation Learning for Interpretable Neural Dialog Generation", In Repository of arXiv:1804.080691, Apr. 22, 2018, 11 Pages.
Zhou, et al., "A Dataset for Document Grounded Conversations", In Proceedings of the Conference on Empirical Methods in Natural Language Processing, Oct. 31, 2018, pp. 708-713.
Zhu, et al., "Flexible End-to-End Dialogue System for Knowledge Grounded Conversation", In Repository of arXiv:1709.04264v1, Sep. 13, 2017, 8 Pages.
Core, et al., "Coding Dialogs with the DAMSL Annotation Scheme", In Proceedings of the AAAI Fall Symposium on Communicative Action in Humans and Machines, vol. 56, Nov. 8, 1997, 8 Pages.
Wu, Ellen, "Constrained Knowledge-Aware Response Generation", Retrieved from https://docs.google.com/presentation/d/1TmRqdjhyNarvtd5heMnNEeCT_X-Ehn65LHUXcAA-alg/edit#slide=id.g62aa619686_0_1071, Nov. 7, 2019, 30 Pages.
Sordoni, et al., "A Neural Network Approach to Context-Sensitive Generation of Conversational Responses", In Proceedings of the Conference of the North American Chapter of the Association for Computational Linguistics Human Language Technologies, May 31, 2015, pp. 196-205.
Reddy, et al., "CoQA: A Conversational Question Answering Challenge", In Transactions of the Association for Computational Linguistics, vol. 7, May 2019, 18 Pages.
See, et al., "What Makes a Good Conversation? How Controllable Attributes Affect Human Judgments", In Proceedings of the Conference of the North American Chapter of the Association for Computational Linguistics Human Language Technologies, vol. 1, Jun. 2, 2019, pp. 1702-1723.
Seo, et al., "Bi-Directional Attention Flow for Machine Comprehension", In Proceedings of the 5th International Conference on Learning Representations, Apr. 24, 2017, 12 Pages.
Serban, et al., "Building End-to-End Dialogue Systems Using Generative Hierarchical Neural Network Models", In Proceedings of the 30th AAAI Conference on Artificial Intelligence, Feb. 12, 2016, pp. 3776-3783.
Shang, et al., "Neural Responding Machine for Short-Text Conversation", In Proceedings of the 53rd Annual Meeting of the Association for Computational Linguistics, Jul. 26, 2015, pp. 1577-1586.
Chen, et al., "Semantically Conditioned Dialog Response Generation via Hierarchical Disentangled Self-Attention", In Repository of arXiv:1905.12866v3, Jun. 9, 2019, 14 Pages.
Le, et al., "End-to-End Multi-Domain Task-Oriented Dialogue Systems with Multi-Level Neural Belief Tracker", Retrieved from https://openreview.net/attachment?id=rylK-kBYwr&name=original_pdf, Sep. 25, 2019, 18 Pages.
"International Search Report and Written Opinion Issued in PCT Application No. PCT/US2020/058995", dated Mar. 1, 2021, 11 Pages.
Adelani, et al., "Generating Sentiment-Preserving Fake Online Reviews Using Neural Language Models and Their Human- and Machine-Based Detection", In Repository of arXiv:1907.09177v1, Jul. 22, 2019, 6 Pages.
Agarwal, et al., "A Knowledge-Grounded Multimodal Search-Based Conversational Agent", In Proceedings of the EMNLP Workshop SCAI: The 2nd International Workshop on Search-Oriented Conversational AI, Oct. 31, 2018, pp. 59-66.
Choi, et al., "QuAC : Question Answering in Context", In Proceedings of the Conference on Empirical Methods in Natural Language Processing, Oct. 31, 2018, pp. 2174-2184.
Das, et al., "Visual Dialog", In Proceedings of the IEEE Conference on Computer Vision and Pattern Recognition, Jul. 21, 2017, pp. 1080-1089.
Devlin, et al., "BERT: Pre-Training of Deep Bidirectional Transformers for Language Understanding", In Repository of arXiv:1810.04805v1, Oct. 11, 2018, 14 Pages.
Dinan, et al., "Wizard of Wikipedia: Knowledge-Powered Conversational Agents", In Proceedings of the 7th International Conference on Learning Representations, May 6, 2019, 18 Pages.
Doddington, George, "Automatic Evaluation of Machine Translation Quality Using N-Gram Co-Occurrence Statistics", In Proceedings of the 2nd International Conference on Human Language Technology Research, Mar. 24, 2002, pp. 138-145.
Dong, et al., "Learning to Generate Product Reviews from Attributes", In Proceedings of the 15th Conference of the European Chapter of the Association for Computational Linguistics: vol. 1, Apr. 3, 2017, pp. 623-632.
Edunov, et al., "Understanding Back-Translation at Scale", In Proceedings of the Conference on Empirical Methods n Natural Language Processing, Oct. 31, 2018, pp. 489-500.
Fan, et al., "Hierarchical Neural Story Generation", In Proceedings of the 56th Annual Meeting of the Association for Computational Linguistics, Jul. 15, 2018, pp. 889-898.
Ficler, et al., "Controlling Linguistic Style Aspects in Neural Language Generation", In Proceedings of the Workshop an Stylistic Variation, Sep. 7, 2017, pp. 94-104.

(56) References Cited

OTHER PUBLICATIONS

Galley, et al., "Grounded Response Generation Task at DSTC7", In AAAI Dialog System Technology Challenges Workshop, Jan. 27, 2019, 5 Pages.

Gao, et al., "Jointly Optimizing Diversity and Relevance in Neural Response Generation", In Proceedings of the Conference of the North American Chapter of the Association for Computational Linguistics: Human Language Technologies, vol. 1, Jun. 2, 2019, pp. 1229-1238.

Gao, et al., "Neural Approaches to Conversational AI", In Journal of Foundations and Trends in Information Retrieval, vol. 13, Issue 2-3, Feb. 21, 2019, pp. 127-298.

Gao, et al., "Structuring Latent Spaces for Stylized Response Generation", In Proceedings of the Conference on Empirical Methods in Natural Language Processing, Nov. 3, 2019, pp. 1814-1823.

Ghazvininejad, et al., "A Knowledge-Grounded Neural Conversation Model", In Proceedings of the 32nd AAAI Conference on Artificial Intelligence, Apr. 27, 2018, pp. 5110-5117.

Hokamp, et al., "Lexically Constrained Decoding for Sequence Generation Using Grid Beam Search", In Proceedings of the 55th Annual Meeting of the Association for Computational Linguistics, Jul. 30, 2017, pp. 1535-1546.

Holtzman, et al., "The Curious Case of Neural Text Degeneration", In Repository of arXiv:1904.09751v1, Apr. 22, 2019, 11 Pages.

Hu, et al., "Improved Lexically Constrained Decoding for Translation and Monolingual Rewriting", In Proceedings of the Conference of the North American Chapter of the Association for Computational Linguistics: Human Language Technologies, vol. 1, Jun. 2, 2019, pp. 839-850.

Hu, et al., "ParaBank: Monolingual Bitext Generation and Sentential Paraphrasing via Lexically-Constrained Neural Machine Translation", In Proceedings of the 33rd AAAI Conference on Artificial Intelligence, vol. 33, Jul. 17, 2019, pp. 6521-6528.

Hu, et al., "Toward Controlled Generation of Text", In Proceedings of the 34th International Conference on Machine Learning, vol. 70, Aug. 6, 2017, 10 Pages.

Huang, et al., "Challenges in Building Intelligent Open-Domain Dialog Systems", In Repository of arXiv:1905.05709v1, May 13, 2019, 21 Pages.

Jurafsky, et al., "Speech and Language Processing", Published by Prentice Hall, 2009, 1038 Pages.

Keskar, et al., "CTRL: A Conditional Transformer Language Model for Controllable Generation", In Repository of arXiv:1909.05858v2, Sep. 20, 2019, 18 Pages.

Lavie, et al., "Meteor: An Automatic Metric for MT Evaluation with High Levels of Correlation with Human Judgments", In Proceedings of the 2nd Workshop on Statistical Machine Translation, Jun. 2007, pp. 228-231.

Li, et al., "A Diversity-Promoting Objective Function for Neural Conversation Models", In Proceedings of the Conference of the North American Chapter of the Association for Computational Linguistics: Human Language Technologies, Jun. 12, 2016, pp. 110-119.

Li, et al., "A Persona-Based Neural Conversation Model", In Proceedings of the 54th Annual Meeting of the Association for Computational Linguistics, Aug. 7, 2016, pp. 994-1003.

Lin, Chin-Yew, "Rouge: A Package for Automatic Evaluation of Summaries", In Proceedings of the Workshop on Text Summarization Branches Out, Post-Conference Workshop of ACL, Jul. 2004, 10 Pages.

Liu, et al., "How Not to Evaluate your Dialogue System: An Empirical Study of Unsupervised Evaluation Metrics for Dialogue Response Generation", In Proceedings of the Conference on Empirical Methods in Natural Language Processing, Nov. 1, 2016, pp. 2122-2132.

Liu, et al., "Knowledge Aware Conversation Generation with Explainable Reasoning Over Augmented Graphs", In Proceedings of the Conference on Empirical Methods in Natural Language Processing, Nov. 3, 2019, pp. 1782-1792.

Liu, et al., "Knowledge Diffusion for Neural Dialogue Generation", In Proceedings of the 56th Annual Meeting of the Association for Computational Linguistics, vol. 1, Jul. 15, 2018, pp. 1489-1498.

Liu, et al., "Stochastic Answer Networks for Machine Reading Comprehension", In Proceedings of the 56th Annual Meeting of the Association for Computational Linguistics, Jul. 15, 2018, pp. 1694-1704.

Luong, et al., "Effective Approaches to Attention-Based Neural Machine Translation", In Proceedings of the Conference on Empirical Methods in Natural Language Processing, Sep. 17, 2015, pp. 1412-1421.

McCann, et al., "Learned in Translation: Contextualized Word Vectors", In Proceedings of the 31st Conference on Neural Information Processing Systems, Dec. 4, 2017, 12 Pages.

Miao, et al., "CGMH: Constrained Sentence Generation by Metropolis-Hastings Sampling", In Proceedings of the 33rd AAAI Conference on Artificial Intelligence, Jul. 17, 2019, pp. 6834 6842.

Moghe, et al., "Towards Exploiting Background Knowledge for Building Conversation Systems", In Proceedings of the Conference on Empirical Methods in Natural Language Processing, Oct. 31, 2018, pp. 2322-2332.

Mostafazadeh, et al., "Image-Grounded Conversations: Multimodal Context for Natural Question and Response Generation", In Proceedings of the 8th International Joint Conference on Natural Language Processing, Nov. 27, 2017, pp. 462-472.

Papineni, et al., "BLEU: A Method for Automatic Evaluation of Machine Translation", In Proceedings of the 40th Annual Meeting on Association for Computational Linguistics, Jul. 6, 2002, pp. 311-318.

Peters, et al., "Deep Contextualized Word Representations", In Proceedings of the Conference of the North American Chapter of the Association for Computational Linguistics: Human Language Technologies, Jun. 1, 2018, pp. 2227-2237.

Prabhumoye, et al., "Towards Content Transfer through Grounded Text Generation", In Repository of arXiv:1905.05293V1, May 13, 2019, 11 Pages.

Qin, et al., "Conversing by Reading: Contentful Neural Conversation with On-demand Machine Reading", In Repository of arXiv:1906.02738v2, Jun. 7, 2019, 10 Pages.

Radford, et al., "Better Language Models and Their Implications", Retrieved from: https://openai.com/blog/better-language-models/, Feb. 14, 2019, 12 Pages.

Radford, et al., "Language Models are Unsupervised Multitask Learners", In Journal of OpenAI Blog, vol. 1, Issue 8, Feb. 2019, 24 Pages.

Rajpurkar, et al., "SQuAD: 100,000+ Questions for Machine Comprehension of Text", In Proceedings of the Conference on Empirical Methods in Natural Language Processing, Nov. 1, 2016, pp. 2383-2392.

\* cited by examiner

FIG. 5
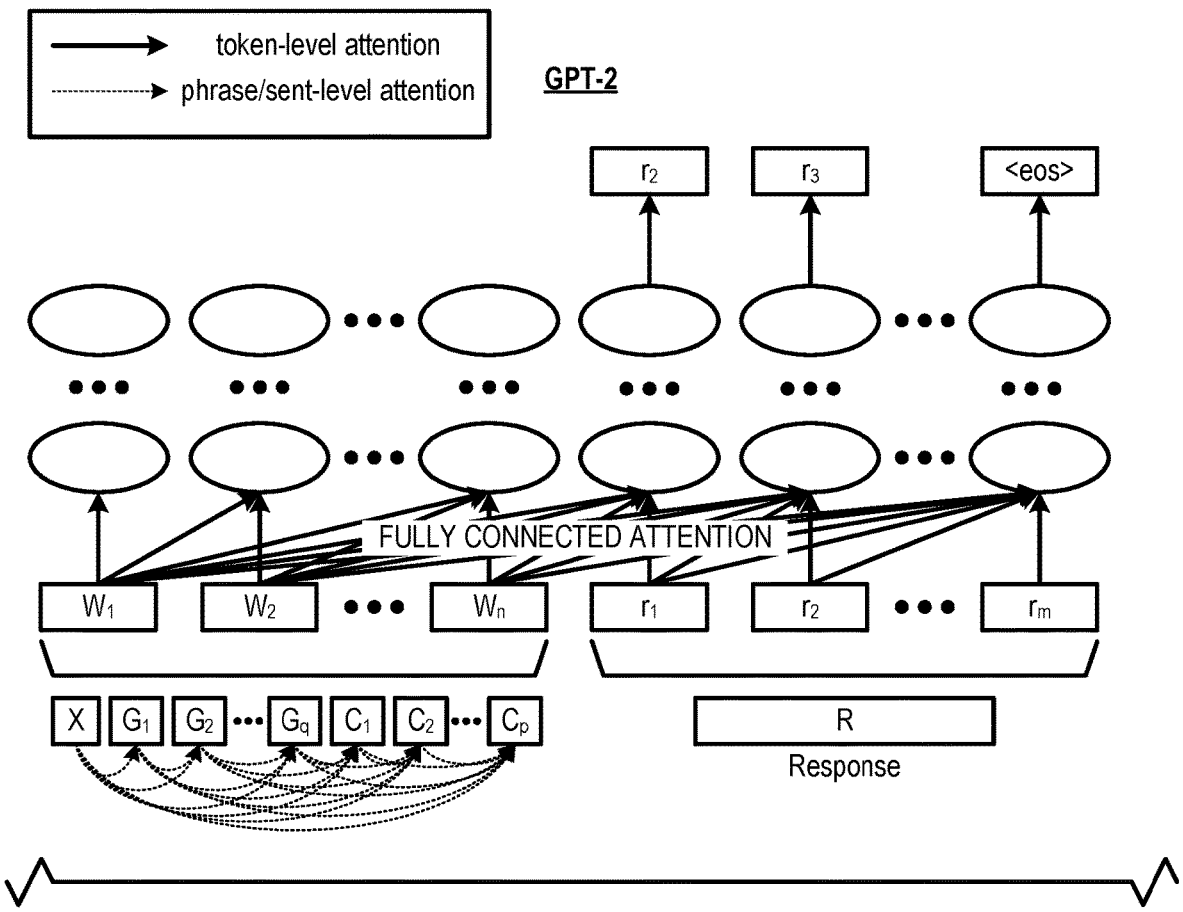
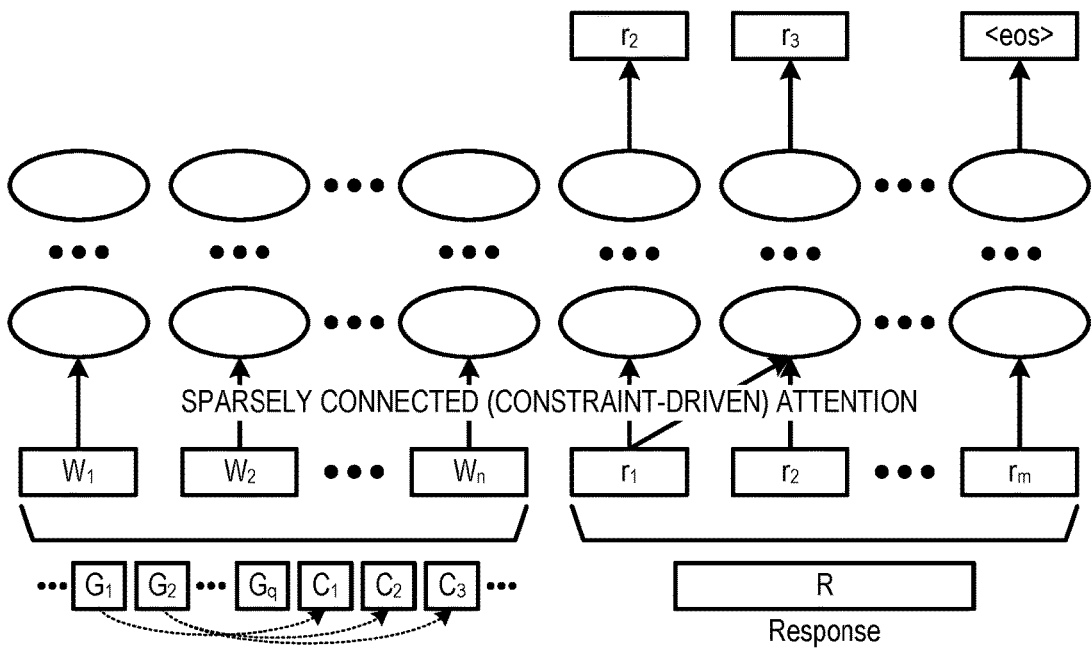

FIG. 6

| Setting | Model | NIST | BLEU | Div-2 | Avg-L | Incl. |
|---|---|---|---|---|---|---|
| 1) $X$ | GPT-2 | 0.90 | 0.55% | 4.9% | 22.2 | — |
| 2) $X+G$ | CMR | 0.34 | 0.17% | 11.3% | 15.1 | — |
| 3) $X+G$ | GPT-2 | 0.98 | 0.67% | 7.5% | 23.1 | — |
| 4) $X+C$ | GPT-2 | 1.67 | 2.65% | 10.7% | 28.7 | 69.4% |
| 5) $X+G_C$ | GPT-2 | 1.34 | 1.58% | 11.1% | 26.6 | 34.8% |
| 6) $X+C+G$ | GPT-2+GBS | 1.60 | 2.38% | 10.6% | 26.8 | 98.0% |
| 7) $X+C+G_C$ | GPT-2 | 1.77 | 3.22% | 11.3% | 27.0 | 65.1% |
| 8) $X+C+G_C$ | GPT2IA | 1.80 | 3.26% | 11.6% | 25.9 | 63.5% |

FIG. 7

| Setting | Model | Content Planner | NIST | BLEU | Div-2 |
|---|---|---|---|---|---|
| $X$ | GPT-2 | - | 1.42 | 1.31% | 18.1% |
| $X+G_C$ | GPT-2 | Retrieval-based | 1.61 | 1.26% | 19.4% |
| $X+\tilde{C}+G_C$ | GPT2IA | Retrieval-based | 1.67 | 1.23% | 20.2% |
| $X+\hat{C}+G_C$ | GPT2IA | BertQA | 1.67 | 1.26% | 19.6% |
| $X+C$ | GPT-2 | Gold | 2.25 | 3.20% | 19.9% |
| $X+C+G_C$ | GPT-2 | Gold | 2.36 | 3.82% | 20.7% |
| $X+C+G_C$ | GPT2IA | Gold | 2.46 | 4.00% | 22.0% |
| Human | - | - | 2.04 | 2.56% | 62.8% |

FIG. 8

| Content Planner | C-Prec | C-Recall | G-Prec | G-Recall |
|---|---|---|---|---|
| Retrieval-based | 13.8% | 5.6% | 5.5% | 21.8% |
| BertQA | 14.7% | 4.8% | 5.0% | 21.3% |
| Gold | 100.0% | 20.9% | 14.7% | 25.8% |

| | GPT2IA | Tied | GPT-2 | |
|---|---|---|---|---|
| Relevance: *Which response is more relevant and appropriate to the preceding dialog?* | | | | |
| $X+\tilde{C}+G_{\tilde{C}}$ | 31.6% | 47.4% | 20.9% | $X$ |
| $X+C+G_C$ | 69.8% | 14.1% | 16.1% | $X+C+G+GBS$ |
| $X+C+G_C$ | 42.1% | 23.5% | 34.4% | $X+C$ |
| $X+C+G_C$ | 38.1% | 28.6% | 33.3% | $X+C+G_C$ |
| Consistency: *Which response is more consistent with the grounding text?* | | | | |
| $X+C+G_C$ | 28.1% | 44.3% | 27.6% | $X+C+G_C$ |
| $X+C+G_C$ | 37.6% | 31.4% | 31.0% | $X+C$ |

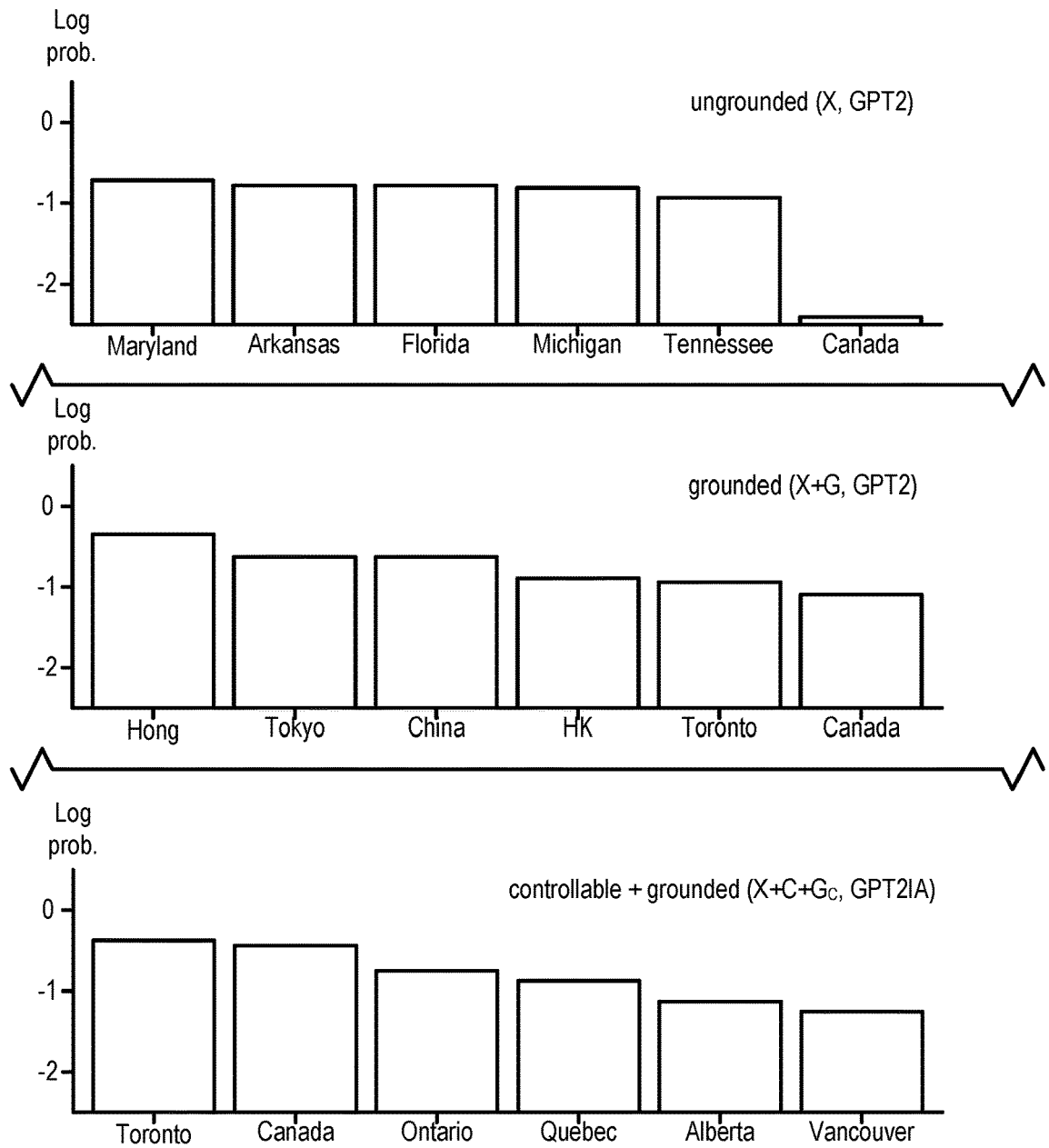

CONTROLLABLE GROUNDED TEXT GENERATION

CROSS REFERENCE TO RELATED APPLICATIONS

This application claims priority to U.S. Provisional Patent Application Ser. No. 62/950,009, filed Dec. 18, 2019, the entirety of which is hereby incorporated herein by reference for all purposes.

BACKGROUND

Computing systems that utilize machine learning or other artificial intelligence techniques may be trained to generate text. However, generating text that is indistinguishable from a human speaker/author is an extremely difficult problem. Recent work on massive neural generation models, such as the generative pre-trained transformer-2 (GPT-2) model, has shown some promise in generating text that has a style and flow that more closely resembles text originating from human speakers/authors. However, text generated by such neural models, when inspected more closely, often includes nonsensical statements and/or facts that are contextually erroneous.

SUMMARY

A controllable grounded response generation framework includes a machine learning model, a grounding interface, and a control interface. The machine learning model is trained to output computer-generated text based on input text. The grounding interface is useable by the machine learning model to access a grounding source including information related to the input text. The control interface is useable by the machine learning model to recognize a control signal. The machine learning model is configured to include information from the grounding source in the computer-generated text and focus the computer-generated text based on the control signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 schematically shows different example machine learning models.

FIGS. 6-9 show different Tables that indicate the results of experiments performed using different machine learning models.

FIG. 10 shows a graph that plots a token-level probability for a potential response provided by two different machine learning models.

FIG. 11 shows different example graphs that indicate the effects of control and grounding on text generation by a machine learning model.

FIG. 12 shows a Table that indicates a manner in which control guides a machine learning model to produce natural language responses with diverging semantics.

DETAILED DESCRIPTION

Text generation computing systems allow computers to mimic the speech and writing capabilities of humans and may be configured to generate text for any number of different purposes. As one example, a human user may have a conversation with a computer (e.g., via synthesized speech and/or written text), and the text generation computing system may generate the computer's "side" of the conversation, which may be presented to the human user in the form of synthesized speech and/or displayed words. As another example, a text generation computing system can be configured to write new text given seed text (e.g., draft a new article about the United States if provided the seed phrase "The United States"). As yet another example, a text generation computing system can be configured to rewrite a complete or partially-complete work previously drafted by a human user (e.g., rewrite a previously-drafted article about the United States with better grammar, spelling, and flow). The text generation computing system described herein improves on prior approaches by cooperatively integrating grounding and control so that the computer-generated text is factually accurate, contextually relevant, and tailored to the human user's interests.

Figure 1:
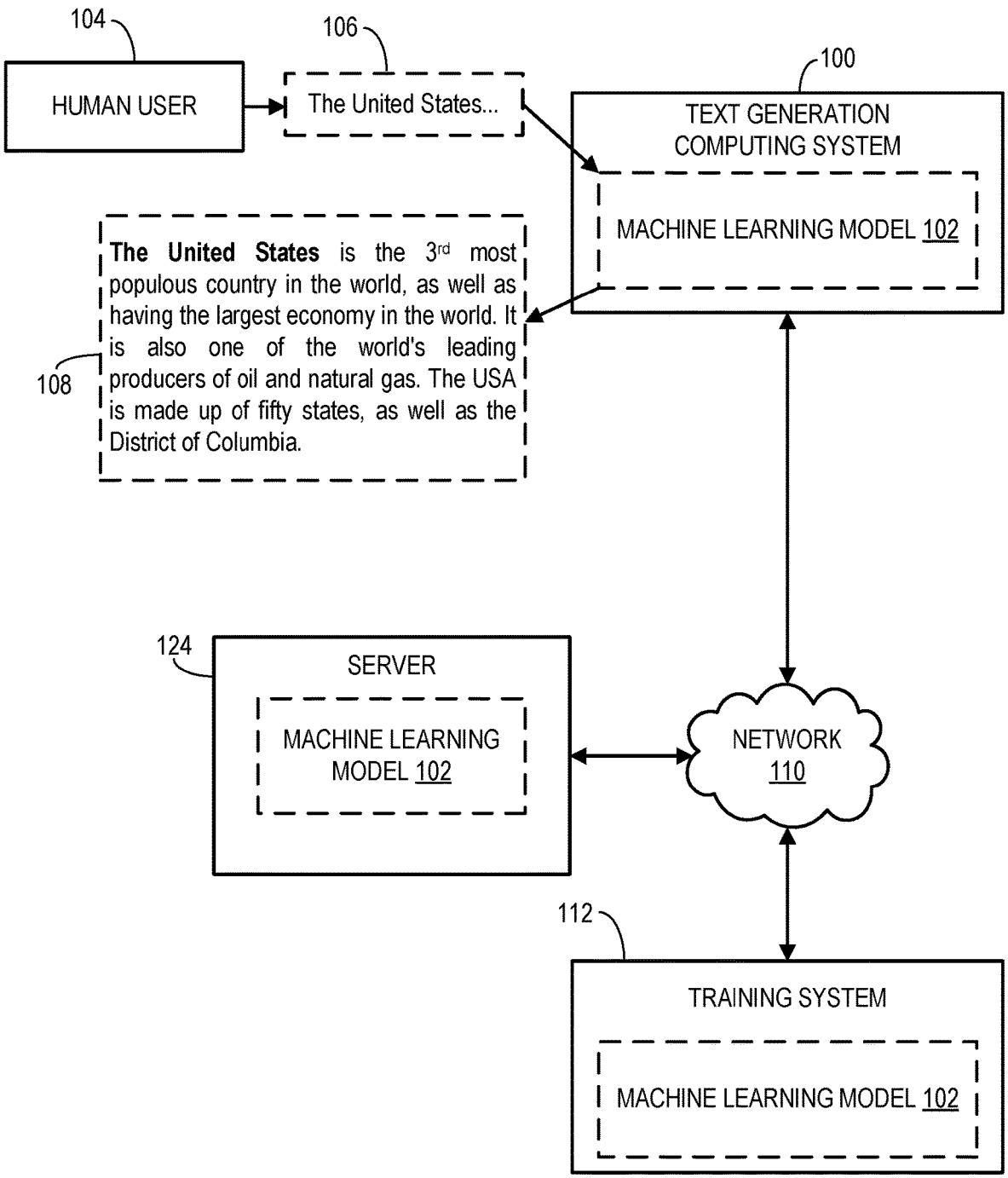
FIG. 1 schematically shows an example text generation computing system implementing a machine learning model.

FIG. 1 schematically shows an example text generation computing system 100 implementing a machine learning model 102. A text generation computing system may have any suitable hardware configuration and form factor. As nonlimiting examples, a text generation computing system may be a laptop computer, desktop computer, smartphone, tablet, media center, smart speaker device, smart watch, virtual/mixed reality device, or Internet of Things (IoT) device (e.g., smart thermostat, light controller, security camera). In some examples, a text generation computing system may be implemented as computing system 1400 described below with respect to FIG. 14.

In the example of FIG. 1, a human user 104 provides input text (also referred to herein as a human- or user-provided text or text seed) 106: "The United States." As a nonlimiting example, user-provided text 106 may be spoken to a computerized personal assistant and subsequently translated to text via a speech recognition machine. As another example, user-provided text 106 may be typed into a computer application such as a word processor, email application, chat application, or other application configured to recognize typed text. More generally, user-provided text may be input using any suitable input hardware (e.g., microphones and/or keyboards) cooperating with any suitable corresponding software. User-provided text may be represented using a text string data structure or any other suitable computer-readable data format. The user-provided text may be referred to herein as a human-provided text seed, because the machine learning model may use the human-provided text seed as a starting point for generating text to assist the user.

Text generation computing systems may be configured to generate text for a variety of different purposes and/or perform other suitable actions to assist a user. Using the example of FIG. 1, after human user 104 inputs the user-provided text 106, the text generation computing system uses machine learning model 102, described in more detail below with reference to FIGS. 3 and 14, to output computer-generated text 108. Computer-generated text 108 expands upon the "United States" topic of user-provided text 106, automatically writing a short paragraph pertaining to the user-provided text 106.

FIG. 1 shows text generation computing system 100 communicatively coupled to a network 110, which may be any suitable computer network (e.g., a local area network (LAN) and/or the Internet). Also coupled to network 110 is a training system 112 configured to train machine learning model 102. Any suitable training process and/or strategy may be used without departing from the scope of this disclosure. The machine learning model 102 may be trained on training system 112 and then deployed to text generation computing system 100 and/or server 124. In some examples, the machine learning model 102 is trained on the training system 112, and then deployed to text generation computing system 100, where the machine learning model locally executes and outputs computer-generated text. In some examples, the machine learning model is trained on the training system 112, and then deployed to server 102. Server 102 may be configured to receive text generation requests from one or more remote devices via network 110, and the server 102 may be configured to output computer-generated text to the requesting device(s) using the machine learning model 102. It should be noted that the text generation computing system and training system need not be network connected. For example, training of the machine learning model may be done offline. Once the model is sufficiently trained, the machine learning model may be copied to a different system—e.g., a personal assistant computing system or a network-accessible server.

Machine learning model 102 may include any suitable model trained to output computer-generated text. In some implementations, machine learning model 102 may include an end-to-end, artificial neural network. In some implementations, machine learning model 102 may include a transformer-based language model. In some implementations, machine learning model 102 is configured to use self-attention. The generative pre-trained transformer (GPT), GPT-2, and GPT-3 models are nonlimiting examples of suitable transformer-based language models that use self-attention. In some implementations, Bidirectional Encoder Representations from Transformers (BERT) may be used.

Figure 2:
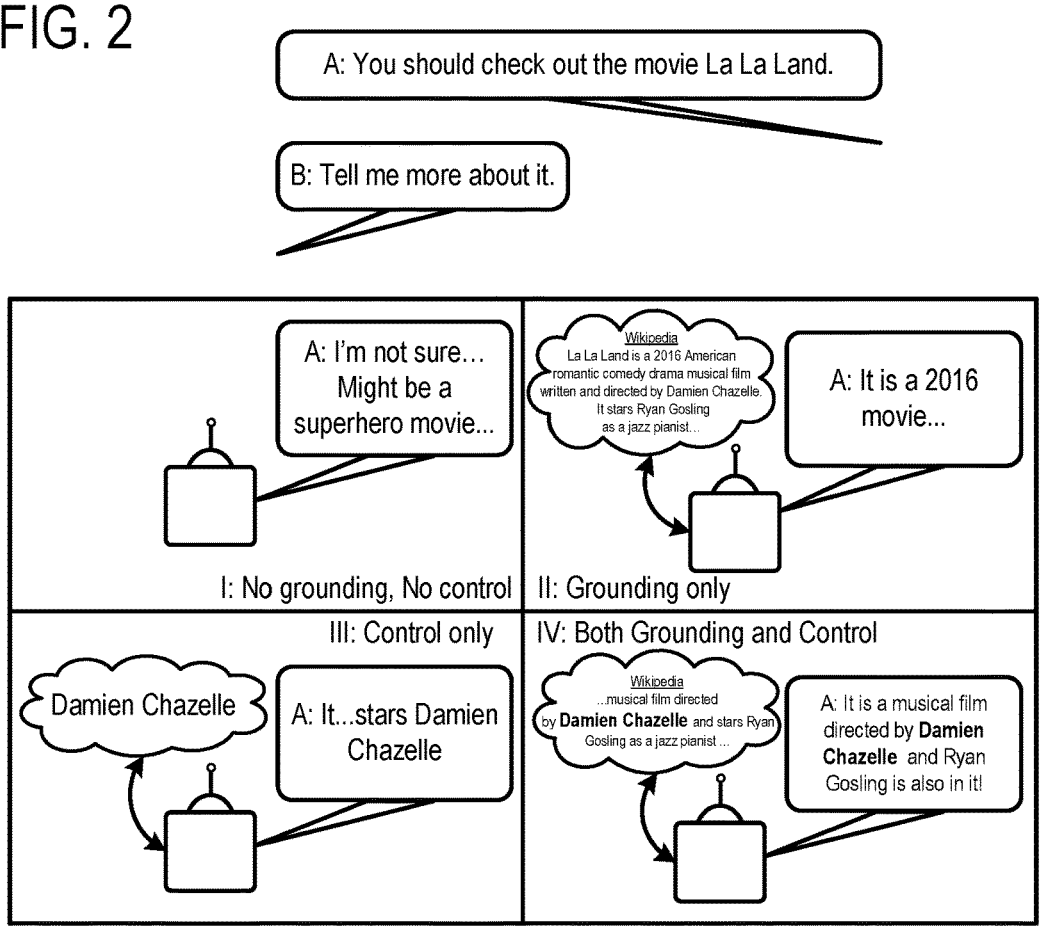
FIG. 2 shows different example conversational responses generated by differently trained machine learning models.

End-to-end neural models for open-domain response generation are capable of generating conversational responses that are both fluent and contextually appropriate. Although the earliest neural generation models were characterized by bland and evasive responses, surprisingly human-like conversations can be generated using recent diversity-enhancing strategies and massive GPT-2/GPT-3 style models. While blandness may no longer present a challenge, the downside has been a propensity towards "hallucinated" or "fake" output of the kind illustrated in scenario I in FIG. 2, where the user states "Tell me more about it." and the model responds by stating "I'm not sure . . . Might be a superhero movie . . . ".

Grounded response generation approaches can inhibit hallucination of facts. Yet grounding alone (e.g., the Wikipedia page about "La La Land" in scenario II of FIG. 2) without control and semantic targeting may induce output that is accurate but vague or irrelevant, such as when the model responds by stating "It's a 2016 movie . . . " in scenario II of FIG. 2. Controllable text generation, on the other hand, provides a level of semantic control that can guide the decoder towards relevant output, but in the absence of grounding control phrases cannot be associated with correct facts (e.g., scenario III in FIG. 2, where the model responds by stating "It . . . stars Damien Chazelle"). However, the text generation framework disclosed herein incorporates both grounding knowledge and lexical control to generate human-like text with reliable, context-appropriate information (e.g., scenario IV in FIG. 2, where the model responds by stating "It is a musical film directed by Damien Chazelle and Ryan Gosling is also in it!").

Figure 3:
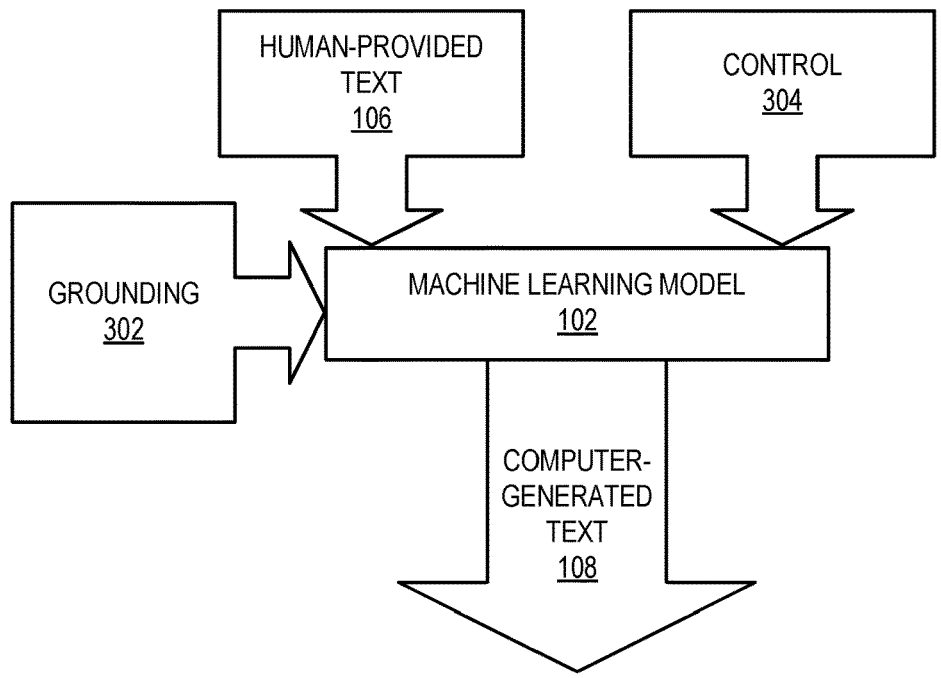
FIG. 3 schematically shows an example controllable grounded response generation framework.

FIG. 3 schematically illustrates a controllable grounded response generation framework (CGRG) 300. The machine learning model 102 of FIG. 1, the computing system of FIG. 14, and/or any other suitable text generation computing system may utilize framework 300. As used herein, "response" is synonymous with text and thus includes text that is not a conversational response (e.g., an original document or an original email message).

As shown in FIG. 3, controllable grounded response generation framework 300 uses machine learning model 102 to output computer generated text 108 based on 1) human-provided text 106, 2) grounding 302, and 3) control 304. As such, controllable grounded response generation framework includes a grounding interface useable by the machine learning model to access a grounding source including information related to the human-provided text, and a control interface useable by the machine learning model to recognize a control signal. The grounding interface and/or the control interface may include an application programming interface (API), application binary interface (ABI), network protocol, file system protocol, helper application, database interface, and/or any other suitable communication channel for inputting information and/or signal into the machine learning model. In some implementations, the grounding interface and/or the control interface may utilize computer hardware of storage subsystem 1404, input subsystem 1408, and/or communications interface 1410, as discussed below with reference to FIG. 14. Using these interfaces, the machine learning model is configured to obtain information from the grounding source(s) and focus the computer-generated text based on the control signal. By using both grounding 302 and control 304, it is believed that computer generated text 108 is of higher quality (e.g., higher contextual relevance, higher factual accuracy, more focused on user's interests) than would be generated if only grounding or control were utilized.

Human-provided text 106 may include a text string data structure (e.g., derived from typed input or output from a speech to text machine), a semantic vector, and/or other machine-recognizable data. In some instances, the human-provided text is part of a conversation with an automated assistant. In some instances, the human-provided text is a partially- or fully-completed composition authored by a human user. Furthermore, it is to be understood that some to all of the human-provided text need not always originate with a human user. As an example, the human-provided text in a conversation scenario may also include previous computer-generated utterances and/or other contextual information. In some instances, the "text" data is derived from another form of information. For example, machine learning model 102 may be configured to generate text based on a photograph, and thus may utilize one or more previously-trained classifiers configured to supply machine learning model with textual descriptors corresponding to the photograph (e.g., supply machine learning model 102 with textual descriptors—Seattle, Space Needle, Daytime, Clouds—based on a photograph of Seattle's Space Needle). In some scenarios, human-provided text is a type of control 304.

Grounding 302 may include domain-agnostic and/or domain-specific information collected in one or more machine-accessible databases and/or other information stores. In some examples, grounding 302 may utilize a general or specific search engine, for example by supplying the search engine all or a subset of human-provided text 106 and/or a semantic vector derived from the human-provided text (e.g., by a previously-trained semantic detection model). In some examples, all the grounding information may be stored locally. In some examples, grounding 302 may be provided by one or more remote sources (e.g., a remote database queried via an Application Programming Interface (API)). As one nonlimiting example, a semantic detection model may operate on human-provided text 106 to assess most likely topics of the human-provided text, and articles retrieved via a search API for the most-likely topics may be used as grounding 302 (e.g., Wikipedia articles provided by a Wikipedia API, or targeted Bing Search results provided by a Bing Search API).

Control 304 may include human-provided control and/or automatically extracted control from a content planner or other automated system. For example, in a scenario in which the human user is using a word processor to author a document, the word processor may be configured to receive input from a user and use the received input as a control signal for focusing the computer-generated text. Lexical controls not only enforce response specificity, but can filter lengthy, irrelevant and/or incoherent groundings. Lexical control of computer-generated text has application in editorial assistants that help a person write a document, an email, and/or other writing, because the user-provided controls can focus the content of the writing on the grounding facts that the person finds most interesting and/or appropriate.

Figure 4A:
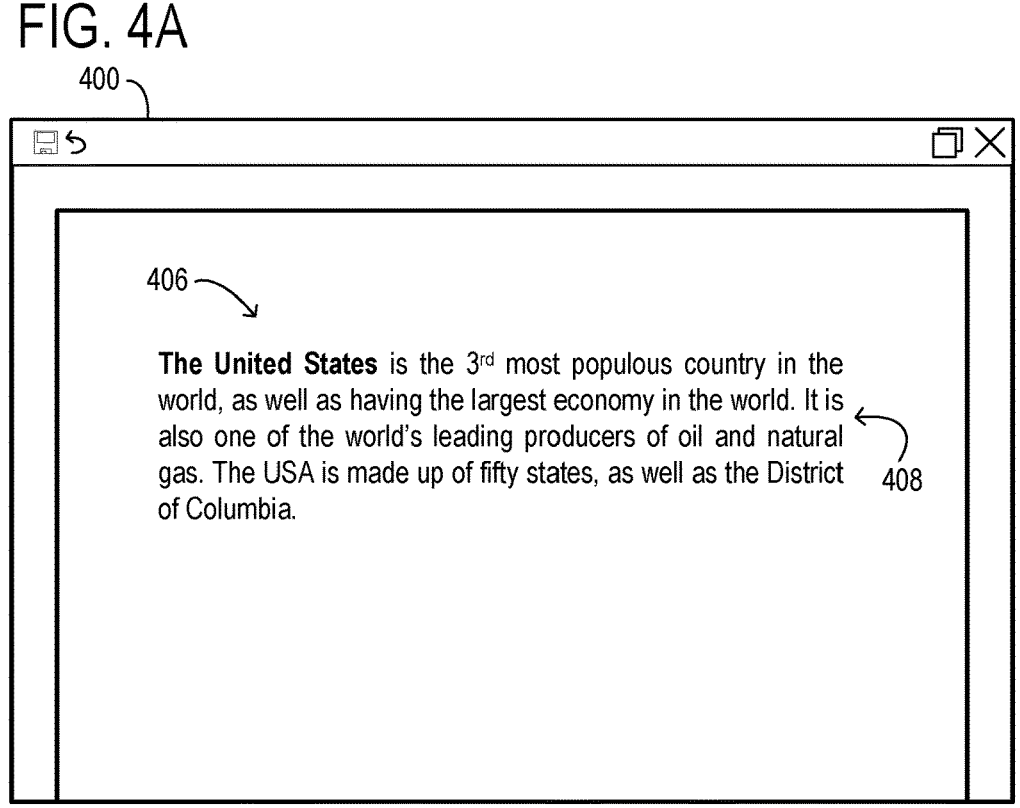
FIGS. 4A-4D show an example scenario in which a control interface of the controllable grounded response framework receives input from a user and uses the received input as a control signal for focusing computer-generated text.

For example, FIG. 4A shows a scenario in which the user types human-provided text 406 "The United States" into a word processor 400, and the word processor uses a machine learning model (e.g., machine learning model 102 of FIGS. 1 and 3) leveraging one or more grounding sources (e.g., grounding 302 of FIG. 3—e.g., a Wikipedia article about the United States) to display computer-generated text 408.

Figure 4B:
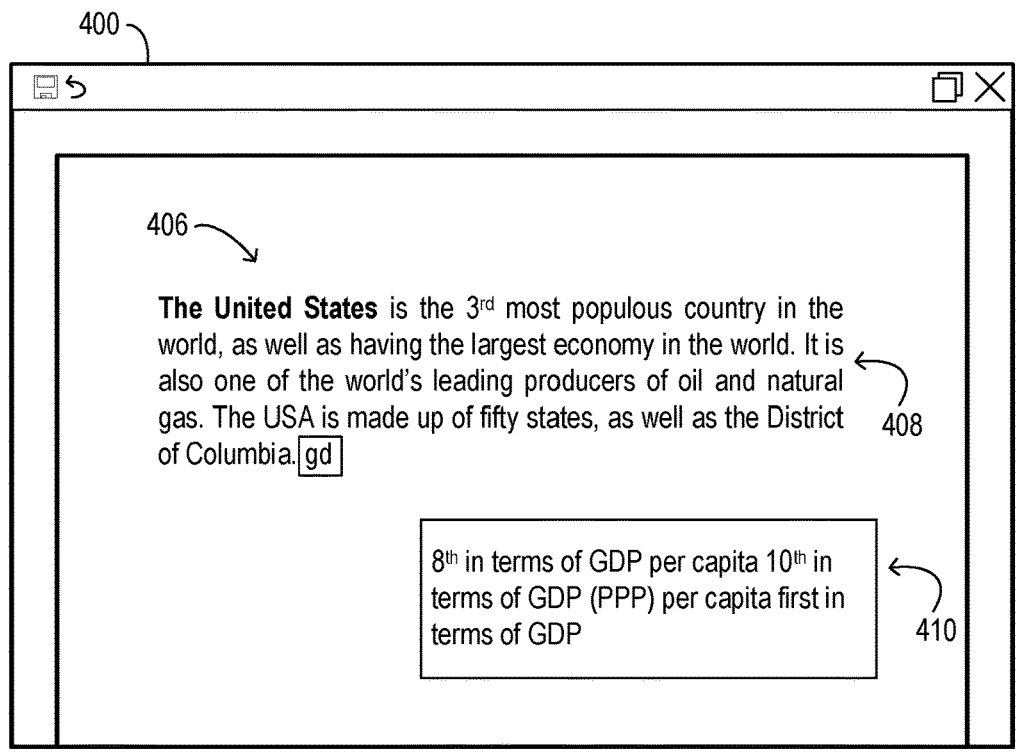
Figure 4C:
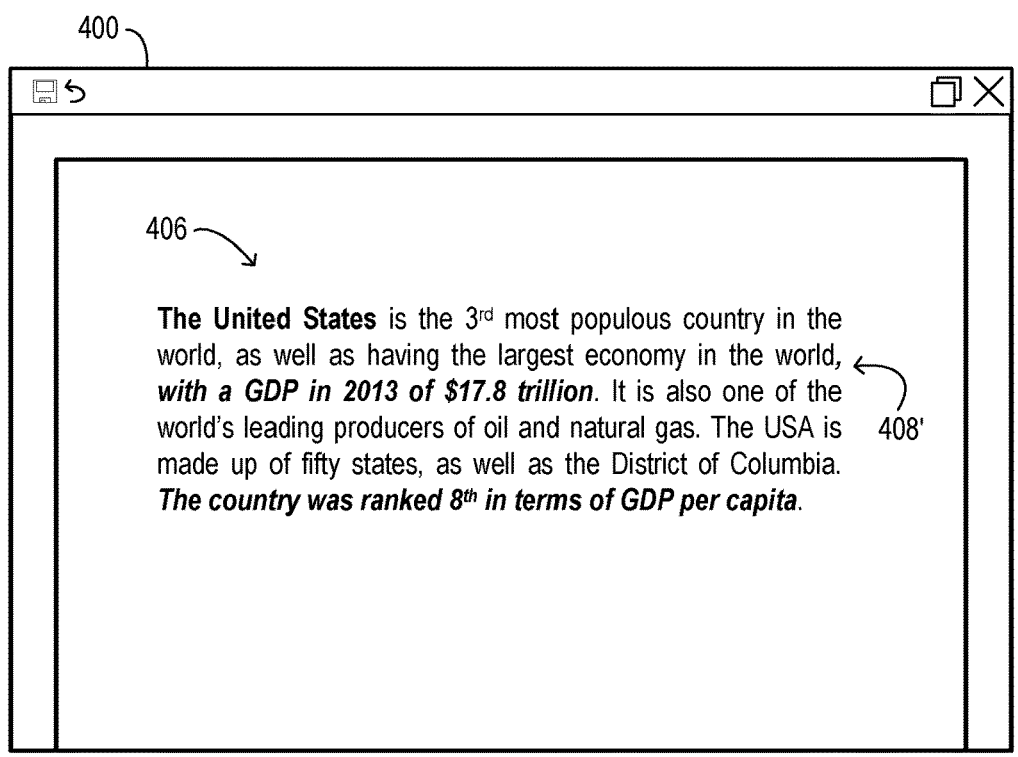

FIG. 4B continues the example of FIG. 4A, and shows that the user has typed the letters "gd" as a continuation of the computer-generated text 408. Responsive to recognizing "gd," the word processor shows salient facts 410 obtained from the "United States" grounding sources as controlled by the "gd" control signal. In the illustrated example, the word processor presents three possible salient facts, and the user selects the first presented fact—"$8^{th}$ in terms of GDP per capita." The selected "$8^{th}$ in terms of GDP per capita" is provided as a control signal to the machine learning model. FIG. 4C shows updated computer-generated text 408', in which passages that are added based on the GDP control signal are in bold and italics.

Figure 4D:
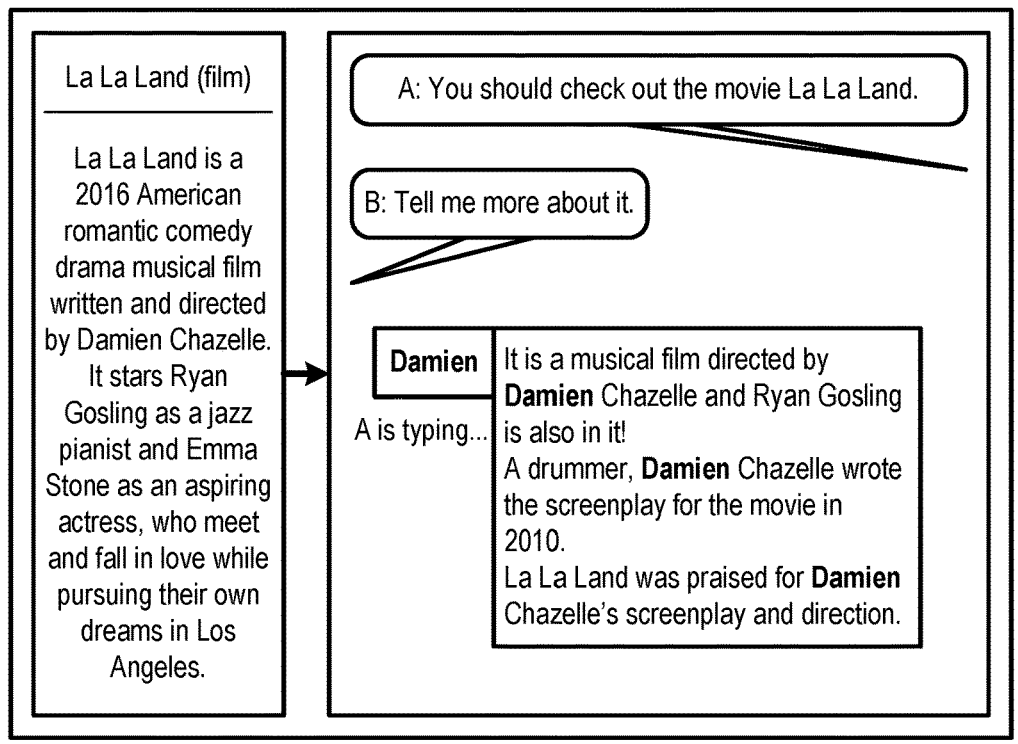

FIG. 4D depicts another example where a person types keywords to indicate their semantic intent, and the machine learning model uses the control to output computer-generated text. In particular, the machine learning model acts as a response editorial assistant that suggests candidate responses for User A according to the conversation history, the user's partial input ("Damien"), and grounding knowledge.

The example of FIGS. 4A-4D are not limiting. Various different user interfaces may be provided to the user for providing human-provided text seeds and/or control signals to the machine learning model. Furthermore, in some scenarios, the control signal may not come directly and/or exclusively from the user. For example, in a scenario in which the user is participating in a conversation with a computerized personal assistant, it may interfere with the flow of the conversation to ask the user for control information useable to focus the computerized personal assistant's conversational utterances. In such examples, the control signal may be automatically generated, for example as described below with reference to a content planner. Furthermore, it should be understood that in at least some implementations, the user-provided text is considered the initial control signal.

In addition to generating text and/or as part of generating text, the text generation computing system 100 of FIG. 1 and/or the controllable grounded response generation framework 300 of FIG. 3 may perform computations, control other computers and/or hardware devices, (e.g., by invoking an API), communicate over networks (e.g., to invoke an API of a remote computing device), and/or perform other computing actions. Other non-limiting examples of such actions include controlling electronic devices (e.g., turning on/off lights in a user's home, adjusting a thermostat, and/or playing multimedia content via display/speakers), interacting with commercial and/or other services (e.g., invoking an API to schedule a ride via a ride-hailing service and/or ordering food/packages via a delivery service), and/or interacting with other computer systems (e.g., to access information from a website or database, send an email, and/or access a user's schedule in a calendar program).

The controllable grounded response generation framework 300 and machine learning model 102 introduced above may be variously configured without departing from the scope of this disclosure. Depending on the desired application, different machine learning models, different helper machines (e.g., speech-to-text machine, semantic detection machine, or image classifier machine), different grounding sources, and/or different control interfaces may be appropriate. The following provides a more detailed discussion of nonlimiting examples of how control and grounding can be combined to provide higher quality computer-generated text. However, it should be understood that numerous variations are within the spirit of this disclosure.

The concept of a controllable grounded response generation framework may be formalized as follows: given dialogue context X, p lexical control phrases $C=(C_1, \ldots, C_p)$ and q sentences of grounding $G=(G_1, \ldots, G_q)$, generate a response $R=(r_1, \ldots, r_m)$ that contains semantic information guided by C. Control can be either directly provided by a user or automatically derived from a content planner. To differentiate, verified or user-provided control is denoted as C, and control that is provided by a content planner is denoted as $\tilde{C}$.

The Controllable Grounded Response Generation optionally may be used in cooperation with a grounded conversational dataset. In the following example, it is assumed that each data instance includes a dialogue context, grounding knowledge, and a reference response. To analyze this framework, a control mechanism that defines one or more control phrases for each instance is provided. For more focus on grounding, the user controls are lexical phrases that are relevant to both target response and some part of the grounding knowledge. Since it may be costly and/or unscalable to have humans annotate all control phrases, lexical matching is used, in which control phrases are informative n-grams that appear in both grounding and the reference response.

As introduced above, the machine learning model may include or be derived from the GPT-2 machine learning model. GPT-2 is a transformer-based language model trained on large scale web data and uses self-attention where each token attends to its left tokens. It is trained with the objective of predicting the next word, given all of the previous words within a defined context window.

To apply GPT-2 within CGRG, X, C (and/or C⁻) and $G_C$ are concatenated as an input sequence, as shown in FIG. 5 (top). The model predicts the next response word given the concatenated input sequence (denoted as S) and the previous response tokens in R. $G_C$ is the subset of G that is relevant to C. For example, in this work, the grounding sentences that contain any phrase in Care denoted as $G_C$. To differentiate the input elements, an end-of-text token <eos> is inserted at the end of each dialogue utterance in X, a<c> token is inserted at the end of each control phrase in C and an <s> token is inserted at the end of each sentence in $G_C$.

The input sequence S and the response sequence R are first concatenated into a long text. The source sequence is denoted as $S=(w_1, \ldots, w_n)$, which is used to generate target sentence R. The conditional probability of P(R|S) can be written as the product of conditional probabilities:

$$p(R|S) = \prod_{k=1}^{m+1} p(r_k | w_1, \ldots, w_n, r_1, \ldots, r_{k-1})$$

where $r_{m+1}$ is the additional end-of-text token indicative of the end of generation.

GPT-2 by default takes as input a consecutive text sequence. Using the above-described approach, each input element of X, C, $G_C$ is in a segmented format, and these segments may not necessarily be strongly connected. Thus, simply concatenating everything into a GPT-2 model could induce noise.

Potentially uninformative attention links for each data example may be removed by injecting preestablished structural information between C and $G_C$. For example, in FIG. 5 (bottom), C can include $C_1$, $C_2$, $C_3$, and $G_C$ can include $G_1$ and $G_2$. If it is known that $C_1$ is only found in $G_1$, then only the attention link between $C_1$ and $G_1$ should be kept, and not between $C_1$ and any of the other grounded sentences. Since it is believed that $G_C$ is a set of segmented sentences from G, all cross-sentence links are removed within $G_C$ tokens. Similarly, all links between non-identical phrases are removed. Thus, the attention links for each data example are predetermined by structural information between C and $G_C$. To implement this, in each transformer layer, attention masks are applied where the removed attention links and links to future tokens have value 0 and the others have value 1. This precalculated attention may be referred to as inductive attention. Each response token still attends to all input tokens and other response tokens on its left.

The start and end positions of a control phrase $Ci \in C$ in S are denoted $c_i^s$ and $c_i^e$ and those of a grounding sentence $Gi \in G_C$ are denoted $g_i^s$ and $g_i^s$. Then the attention mask M is calculated as follows:

$$M_{i,j} = \begin{cases} 0 & \text{if } i < j \\ 0 & \text{if } i \in [c_k^s, c_k^e], j \in [c_l^s, c_l^e], k \neq l \\ 0 & \text{if } i \in [g_k^s, g_k^e], j \in [g_l^s, g_l^e], k \neq l \\ 0 & \text{if } i \in [c_k^s, c_k^e], j \in [g_l^s, g_l^e], C_k \notin G_l \\ 1 & \text{otherwise} \end{cases}$$

Then for each transformer head, the stacked matrices Q, K, and V may represent each example sequence (concatenated S and T). The attention is calculated as follows (dis the model dimension):

$$\text{Attention}(Q, K, V) = \text{softmax} \frac{M \circ QK^T}{\sqrt{d}} V$$

The effectiveness of the herein disclosed models can be assessed by experimenting with two content planners when gold constraints (i.e., verified constraints provided by users) are not provided. The first content planner is a simple retrieval-based pipeline in which, for each test dialogue context, (i) the sentences in G is ranked by IDF-weighted word overlaps with X; (ii) statistical phrases from the top 50 sentences are extracted; and (iii) the two statistical phrases that appear most frequently in the 50 sentences are used as C⁻. For simplicity, only noun phrases may be used.

BERT QA forms the basis for the second content planner. A BERT QA model may be fine-tuned on the training examples, with X as the query, G as the document, and C as answers. Then the fine-tuned model may be used to predict answers on test examples. The top 2 answers may serve as the predicted control phrases C⁻, and the second may be dropped if the string overlaps with the first.

Implementation Details: Type and positional embedding: In the above described GPT-2 baseline and Inductive Attention (GPT2IA) models, there is both type embedding and positional embedding for each input token. X each sentence in GC, each phrase in C and response R may be treated as separate segments. The maximum number of sentences in $G_C$ may be set to 20, and the maximum number of phrases in C may be set to 10, thus yielding "0" for X "1-20" for $G_C$; "21-30" for C and "31" for R tokens as type embeddings. Further, for each segment in the input, the position embedding for each token is its position in that segment.

Training: In one example scenario, a small version of GPT-2 with 117M parameters may be used, with the maximum length of the input or target response sequence at 512. BPE tokenization may be used, following GPT-2. The model and all other GPT-2 based baselines may be trained on top of DialoGPT, which is a conversational response generation model trained on 147M Reddit comment chains on the basis of GPT-2. None of DialoGPT's Reddit training or validation examples overlap with the test examples. Batch size 32 may be used, and learning rate and warmup steps may be tuned on valid set.

Inference: Greedy search may be used as the decoding strategy for GPT-2 and GPT2IA setups. However, an experiment setting may also apply grid beam search (GBS) for comparison with lexical constrained decoding and/or other decoding methods. The comparison with GBS may provide insight as to whether it helps to encode the constraints into the hidden state during both training and inference, as GBS uses lexical constraints only during inference.

Dataset: A grounded Reddit conversation dataset featuring Reddit conversations about web pages (e.g., news stories and Wikipedia articles) covering 178 subreddits may be used. In order to make this dataset support controllable text generation, each n-gram (n≤5) in the reference response may be matched to each grounding sentence. In order to ensure certain informativeness of control phrases, an IDF threshold (e.g., 8.5) for unigrams may be set. When two n-grams are identical except for an added function word or punctuation, only the shorter version is used. In addition, the matched n-grams that appear in dialogue context may be removed on the belief that new words are more informative. For each data instance, the remaining matched n-gram(s) are the control phrases. Crowdsourced workers may be used to annotate whether the extracted control phrases are central to the reference response given the dialogue context. For example, each response may be graded (e.g., on a 1-6 scale) by a plurality of judges (e.g., three judges), and the average score may be used to assess the response. In an example test of 2000 annotated examples, the median score was 4.33 and 67.4% of examples had a score over 4. Only examples where at least one matched phrase can be found were kept. Such strict lexical matching between target response and grounding is believed to increase the likelihood that the kept examples had a high ratio of grounding utilization, which promoted leveraging grounding in response generation. After the processing, the number of utterances of train, dev and test were reduced (e.g., train reduced from 2.36M to 390K; dev reduced from 0.12M to 6.7K, and test reduced from 0.34M to 21K). In the test, the average length of all reference responses increased from approximately 18.5 to 26.5; the average number of phrases in C for train, dev and test were 1.32, 1.27, and 1.38 respectively; the average numbers of sentences in $G_C$ for train, dev and test were 4.37, 4.32, and 4.25 respectively. Up to 3 dialogue turns were used in the experiments.

Experimental Setup: Evaluated Systems: Experiments were conducted to draw insights from comparison of different response generation models and input settings. The models were evaluated according to the following settings:

X: This is the standard setting for non-controllable response generation, where only the dialogue context is given (i.e., no grounding and no control). Experiments were conducted using the state-of-the-art generation model GPT-2.

X+G: This is the standard setting for grounded response generation (i.e., no control). Two models were compared: CMR and GPT-2. CMR is the state-of-the-art grounded response generation model that combines an MRC model and an LSTM decoder. GPT-2 for this setting concatenates X and G as its input. Note that as both models have input sequence length limits, only a randomly chosen subset of grounding sentences were fed into each model.

X+C: This is the controllable response generation setting (i.e., no grounding). Experiments were conducted using GPT-2 by concatenating X and C.

X+$G_C$: This setting measured how only grounding relevant to C can help with response generation, but when C is not explicitly provided. Experiments were conducted using GPT-2 by concatenating X and $G_C$ as the input.

X+C+$G_C$: This setting measured how grounded control can help with response generation. Experiments were conducted using GPT-2 and GPT2IA by concatenating X, $G_C$, and C as the input.

X+C+G: This setting compares against other constrained generation methods, such as the grid beam search (GBS) where lexical control phrases are only added in the decoding stage without affecting training. Experiments where conducted using GPT-2 where X and G are the only encoded inputs and C is only applied in decoding with GBS.

To provide more insight into experiment scores, human responses were also evaluated as a 'system'. This is possible because a multi-reference test set with 3.3k unique test dialogue contexts was used. For each test dialogue context, up to 6 references were retrained and one was set aside for evaluation, so the "human response" can be evaluated against the remaining references for automatic evaluation. To ensure comparability, all systems are evaluated against the same 5 references. For each evaluation metric, the highest score among the 5 references is reported.

Evaluation: Experiments included both user-controllable (i.e., 'gold' user-provided control phrases) and automatic (i.e., control phrases from a content planner) response generation. As different reference responses incorporate different gold control phrases, single-reference evaluation was used for the user-controllable setting. Predicted control phrases are independent of reference responses, so multi-reference evaluation could be used in the automatic generation setting.

For automatic evaluation, the overall relevance of the generated responses was measured with metrics including BLEU-4, ME-TEOR, and NIST-4. NIST is a variant of BLEU that weights n-gram matches by their information gain, which penalizes uninformative n-grams. The diversity of n-grams in generated responses was measured with Distinct-n as the ratio between the number of n-gram types and the total number of n-grams. Human evaluation was also used, as described in more detail below.

In order to give a sense of how control phrases help enforce the specificity level for generation, in the user-controllable setting, control phrase inclusion rate, the percentage of gold control phrases being hardly included in the generated responses, is reported. However, lower inclusion rate does not necessarily indicate worse performance in satisfying the user's control request, as the lexical control phrases are treated as soft semantic guidance in generation, instead of hard constraints.

Results and Analysis: User-Controllable Response Generation: The user-controllable grounded response generation framework is analyzed using single-reference evaluation. In the Table of FIG. 6, lines 1-3 are not controllable settings and do not have control phrases as input, while lines 4-8 have control phrases as input either explicitly or implicitly. The huge performance gap between lines (1-3) and (4-8) indicates the value of adding control. Furthermore, the following conclusions may be drawn by comparing lines in the Table of FIG. 6: (i) 1 vs. 3: Simply adding groundings to the model input improves the performance to a limited extent; (ii) 2 vs. 3: GPT-2 in general performs better than the state-of-the-art grounded model CMR, which indicates the combination of pre-training and having a transformer based decoder helps improve text generation; (iii) 4 vs. 7-8: Providing constraint-sensitive grounding boosts performance compared to having all the grounding; (iv) 5 vs. 7-8: providing control phrases in an explicit way is important; (v) 6 vs. 7-8: applying control in hidden states helps the model generate better quality responses than applying control at decoding only; and (vi) 7 vs. 8: Inductive attention helps reduce noise and improve the performance of GPT-2.

Although the comparison between line 6 vs. 7-8 shows that applying control in hidden states is more effective than strict constraints at decoding, controls at training and decoding stage could potentially be complementary.

Automatic Response Generation: In a fully automatic conversation scenario, a content planner may be used to predict control phrases in order to leverage the herein disclosed framework for automatic response generation. The Table in FIG. 7 shows that two simple ways of extracting control phrases, as discussed above, can boost the generation performance.

The first part of the Table of FIG. 7 compares settings where either no control or predicted control phrases ($C\tilde{}$) are provided to the model. It can be seen that both the retrieval-based and BERT QA based content planners achieve good results.

The second part of Table of FIG. 7 shows upper bounds by evaluating on gold control phrase setting and the carved out human response. For each test dialogue context, one of the up to 5 references was randomly chosen and the corresponding gold control phrase was used to do generation and evaluate against the 5 references. The final line of the Table of FIG. 7 shows the results for evaluations on the human response. It is noted that in the multi-reference setting, $X+C+G_C$ with GPT2IA still gives the best performance. The difference between the Tables of FIGS. 6 and 7 for gold control settings reflect the fact that metrics like NIST and BLEU are expected to be higher in multi-reference than in single-reference evaluation.

As an intermediate assessment of the content planner, the Table of FIG. 8 reports the precision and recall of tokens in $C\tilde{}$ and G, with respect to reference responses (counts for stop-words and punctuation tokens are removed). For each test dialogue context, the values for the reference response that gives the highest F1 score were calculated, and the average among all test examples for each metric are reported. It is noted that the retrieved-based content planner predicts slightly better quality phrases than BERT QA, while still far away from the gold control phrases.

By comparing the upper and bottom half of the Table of FIG. 8, it can be seen that using a better designed content planner could potentially result in the model generating better quality responses.

Human Evaluation: Human evaluation was conducted using crowd-sourced workers. Results for relevance and appropriateness to the preceding dialog and consistency with the background text (as a metric of factual correctness) are given in the Table of FIG. 9. Judges were presented with paired randomized outputs from each system. Document title, a short snippet of the document, and up to two conversational turns were provided as context. Judgments were entered on a five-point Likert scale, and ties were permitted. Three to four judges evaluated each pair and metrics were imposed to block poorly performing judges. Inter-rater agreement, was "fair" with Krippendorffs alpha coefficient at 0.32. $X+C+G_C+$GPT2IA outperformed other systems, except in the case of Consistency, where there is no statistical difference between $X+C+G_C+$GPT2IA and $X+C+G_C+$GPT2, both grounded systems.

Figures 9, 10:
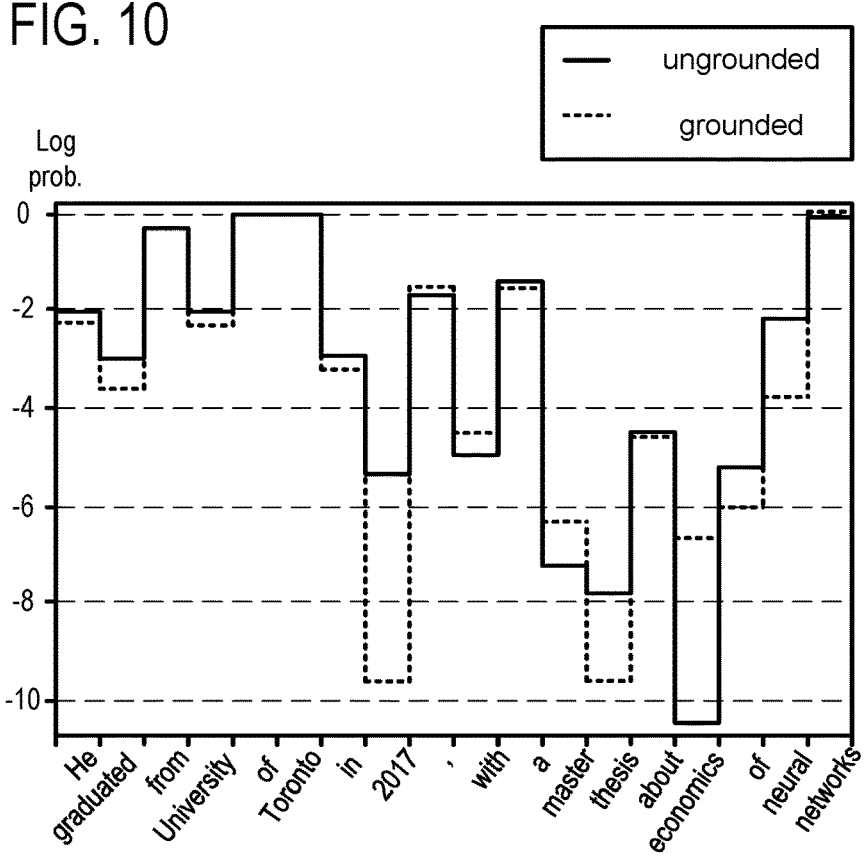

Qualitative Analysis: FIG. 10 shows how grounding knowledge assists generation by plotting the token-level probability for both $X+C$ and $X+C+G_C$ systems. An example about an uncommon entity is selected to eliminate the possibility that the knowledge is captured in pre-training. FIG. 10 shows the token-level probability of a potential response, given the dialogue context "Do you know the education background of the new faculty, Sam?", control phrases "University of Toronto" and "neural networks", and grounding sentences "Sam got his bachelor degree in Physics at University of Science and Technology of China. He spent 6 months at University of Tokyo in Japan as a visiting student, when he was a master student in Computer Science at University of Hong Kong from 2010-2012. And he finished his PhD at University of Toronto in Canada with his research focused on interpretability of neural networks on text generation in 2017." The grounded model assigns higher probabilities to contextual words from grounding such as "graduated" and "thesis" as well as to factually correct entity tokens like "2017." The grounded model assigns lower probability to factually incorrect tokens such as "economics." These facts suggest that grounding knowledge can potentially help controllable generation: (i) contextualize control phrases; and (ii) distinguish correct and incorrect facts.

FIG. 11 further shows the effects of control and grounding on text generation. FIG. 11 lists the top 6 tokens after a partial response given the same dialogue context and grounding, and the control phrase "Canada". The ungrounded and non-controllable model gives equally distributed probabilities to commonly known American state names after "University of". Adding grounding helps the model rank locations based on the background knowledge. Further adding controls helps the model locate the correct or intended answer.

Explicit control phrases can be leveraged to dissect the generation process. The Table of FIG. 12 shows how controls may guide or perturb the GPT2IA model to produce responses with diverging semantics.

The CGRG framework allows users to inject soft semantic control into the text generation process. The CGRG framework incorporates grounding to contextualize users' semantic intents as well as to boost information reliability. An inductive attention mechanism can be added to boost performance for self-attention-based generation models like GPT-2. The CGRG framework can be configured to use a content planner to automatically supply control without explicit user control.

Note that the concepts described herein may be broadly applicable to any suitable pre-trained text generation model. In some implementations, such a pre-trained text generation model may include a transformer-based model such as GPT-1, GPT-2, GPT-3, BERT, and Robust Bidirectional Encoder Representations from Transformers (RoBERTa). In other implementations, the pre-trained text generation model may be configured to work with a different kind of underlying architecture, such as a long short-term memory (LSTM) neural network model.

Figure 13:
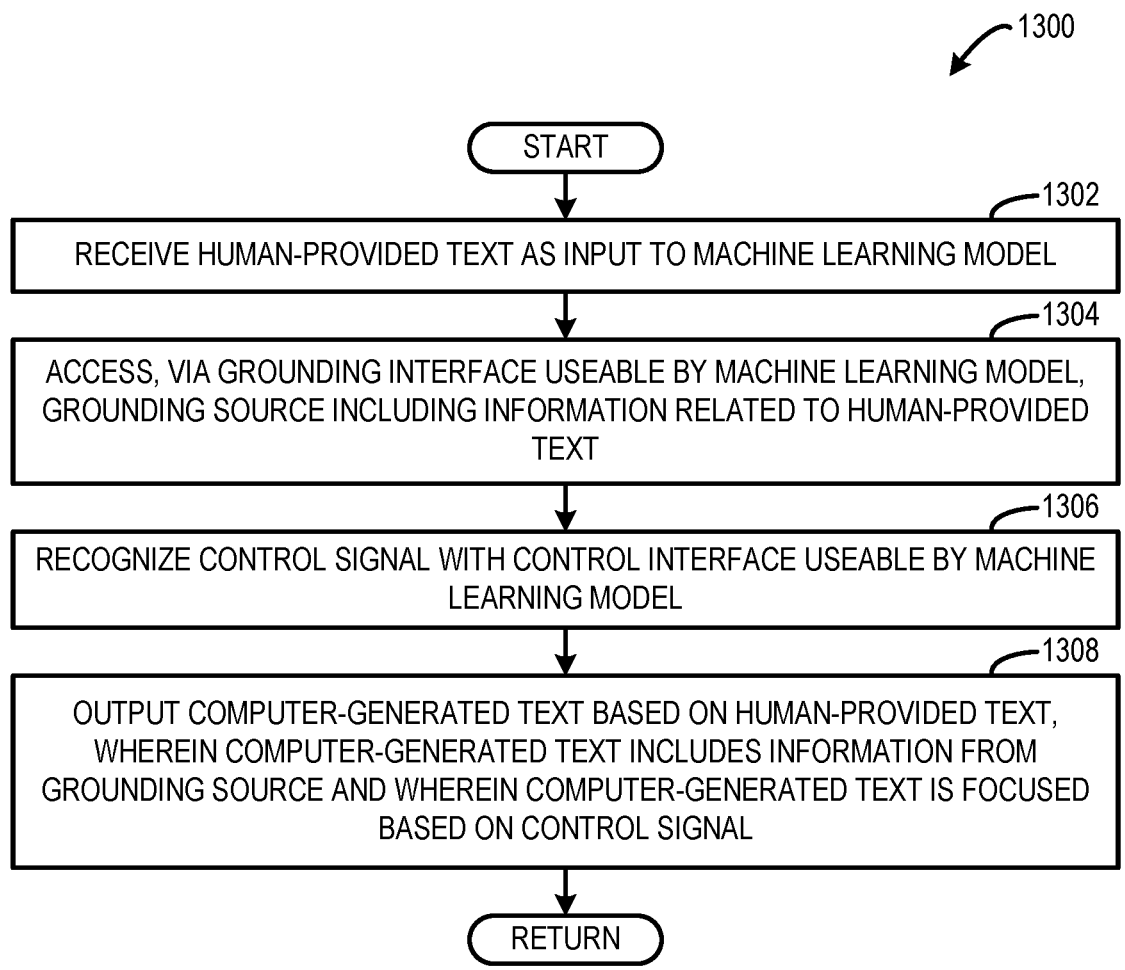
FIG. 13 is a flowchart of an example method for providing computer-generated text in response to input from a user.

FIG. 13 shows an example method 1300 for providing computer-generated text in response to input from a user. For example, the method may be performed by a computing system configured to train and/or execute a controllable grounded response generation framework (CGRG) 300 utilizing a machine learning model, as described above.

At 1302, the method 1300 includes receiving human-provided text as input to the machine learning model.

At 1304, the method 1300 includes accessing, via a grounding interface useable by the machine learning model, a grounding source including information related to the human-provided text. In some examples, the grounding source may be a network-accessible grounding source, and the grounding interface may be configured to retrieve information from the grounding source via a network.

At 1306, the method 1300 includes recognizing a control signal with a control interface useable by the machine learning model. In some examples, the control signal may be human provided. In other examples, the control signal may be automatically computer generated, such as a by a content planner.

At 1308, the method 1300 includes outputting computer-generated text based on the human-provided text, wherein the computer-generated text includes information from the grounding source and wherein the computer-generated text is focused based on the control signal.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 14:
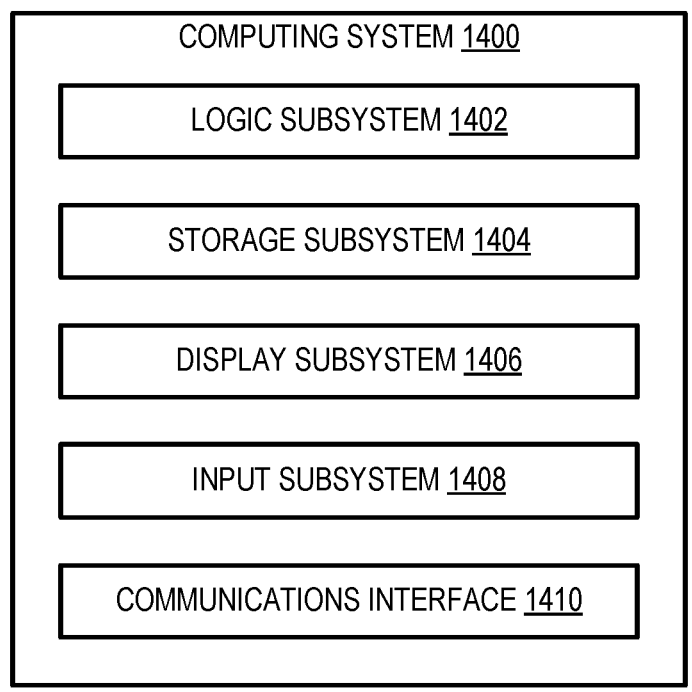
FIG. 14 schematically shows an example computing system.

FIG. 14 schematically shows a simplified representation of a computing system 1400 configured to provide any to all of the compute functionality described herein. Computing system 1400 may be configured to train and/or execute a controllable grounded response generation framework (CGRG) 300 utilizing a machine learning model, as described above. Computing system 1400 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1400 includes a logic subsystem 1402 and a storage subsystem 1404. Computing system 1400 may optionally include a display subsystem 1406, input subsystem 1408, communication subsystem 1410, and/or other subsystems not shown in FIG. 14.

Logic subsystem 1402 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1404 includes one or more physical devices configured to temporarily and/or permanently hold computer information such as data and instructions executable by the logic subsystem. When the storage subsystem includes two or more devices, the devices may be collocated and/or remotely located. Storage subsystem 1404 may include volatile, nonvolatile, dynamic, static, read/write, read-only, random-access, sequential-access, location-addressable, file-addressable, and/or content-addressable devices. Storage subsystem 1404 may include removable and/or built-in devices. When the logic subsystem executes instructions, the state of storage subsystem 1404 may be transformed—e.g., to hold different data.

Aspects of logic subsystem 1402 and storage subsystem 1404 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AT knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AT) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

When included, display subsystem 1406 may be used to present a visual representation of data held by storage subsystem 1404. This visual representation may take the form of a graphical user interface (GUI). Display subsystem 1406 may include one or more display devices utilizing virtually any type of technology. In some implementations, display subsystem 1406 may include one or more virtual-, augmented-, or mixed reality displays.

When included, input subsystem 1408 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition. Input subsystem 1408 may be used to provide control (e.g., control 302 of FIG. 3) and/or human-provided text (e.g., human-provided text 106 of FIGS. 1 and 3).

When included, communication subsystem 1410 may be configured to communicatively couple computing system 1400 with one or more other computing devices. Communication subsystem 1410 may include wired and/or wireless communication devices compatible with one or more different communication protocols. The communication subsystem may be configured for communication via personal-, local- and/or wide-area networks. Communication subsystem 1410 may be used to access grounding (e.g., grounding 302 of FIG. 3) from remote sources. Communication subsystem 1410 also may be used to transmit a request for text generation and/or generated text between cooperating but remotely-located computing systems.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a storage subsystem holds instructions executable by a logic subsystem to instantiate a controllable grounded response generation framework. The framework comprises a machine learning model trained to output computer-generated text based on input text, a grounding interface useable by the machine learning model to access a grounding source including information related to the input text, and a control interface useable by the machine learning model to recognize a control signal, wherein the machine learning model is configured to include information from the grounding source in the computer-generated text and focus the computer-generated text based on the control signal. In this example and/or other examples, the instructions may be part of a word processing application, and the framework may be used by the word processing application to automatically write and/or rewrite a document for a human user based on the input text, the grounding source, and the control signal. In this example and/or other examples, the instructions may be part of an email application, and the framework may be used by the email application to automatically write and/or rewrite an email message for a human user based on the input text, the grounding source, and the control signal. In this example and/or other examples, the input text may be conversational text, the instructions may be part of a personal assistant application, and the framework may be used by the personal assistant application to automatically generate conversational utterances for responding to the conversational text of a human user based on the conversational text, the grounding source, and the control signal. In this example and/or other examples, the control signal may be received via a user interface. In this example and/or other examples, the control signal may comprise control phrases generated using an automated system. In this example and/or other examples, the grounding source may be a network-accessible grounding source, and the grounding interface may be configured to retrieve information from the grounding source via a network. In this example and/or other examples, the machine learning model may include a transformer-based language model. In this example and/or other examples, the machine learning model may use self-attention. In this example and/or other examples, the machine learning model may use inductive attention.

In an example, a storage subsystem holds instructions executable by a logic subsystem to instantiate a word processing application, the word processing application comprises a user interface configured to receive an input text seed and a control signal comprising user input, a machine learning model trained to output computer-generated text based on the input text seed, a grounding interface useable by the machine learning model to access a grounding source including information related to the input text seed, and a control interface useable by the machine learning model to recognize the control signal, wherein the machine learning model is configured to include information from the grounding source in the computer-generated text and focus the computer-generated text based on the control signal. In this example and/or other examples, the word processing application may be configured to automatically write and/or rewrite a document for a human user based on the input text seed, the grounding source, and the control signal. In this example and/or other examples, the word processing application may be an email application configured to automatically write and/or rewrite an email message for a human user based on the input text seed, the grounding source, and the control signal. In this example and/or other examples, the user interface may include an audio-input interface and the input text seed may be conversational text spoken by a human user. In this example and/or other examples, the user interface may include an audio-input interface and the control signal is conversational text. In this example and/or other examples, the machine learning model may include a transformer-based language model. In this example and/or other examples, the grounding source may be a network-accessible grounding source, and the grounding interface may be configured to retrieve information from the grounding source via a network. In this example and/or other examples, the machine learning model may use self-attention. In this example and/or other examples, the machine learning model may use inductive attention.

In an example, a computer-implemented method is performed by a machine learning model. The method comprises receiving input text as input to the machine learning model, accessing, via a grounding interface useable by the machine learning model, a grounding source including information related to the input text, recognizing a control signal with a control interface useable by the machine learning model, and outputting computer-generated text based on the input text, wherein the computer-generated text includes information from the grounding source and wherein the computer-generated text is focused based on the control signal.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A storage subsystem holding instructions executable by a logic subsystem to instantiate a controllable grounded response generation framework, the framework comprising:
   computer-executable instructions to instantiate a machine learning model trained to output computer-generated text based on input text received from a computer application, wherein the machine learning model uses inductive attention;
   computer-executable instructions providing the machine learning model a grounding interface to access a grounding source including grounding information related to the input text; and
   computer-executable instructions providing the machine learning model a control interface to recognize a control signal;
   wherein the machine learning model incorporates focused grounding information relevant to the input text in the computer-generated text, the focused grounding information selected from the grounding information based on the control signal, and wherein the computer application automatically composes and outputs the computer-generated text.

2. The storage subsystem of claim 1, wherein the computer application is a word processing application, and the framework is used by the word processing application to automatically write and/or rewrite a document for a human user by incorporating the computer-generated text into the document.

3. The storage subsystem of claim 1, wherein the computer application is an email application, and the framework is used by the email application to automatically write and/or rewrite an email message for a human user by incorporating the computer-generated text into the email message.

4. The storage subsystem of claim 1, wherein the computer application is a personal assistant application, wherein the input text is conversational text from the personal assistant application, and wherein the personal assistant application t-e automatically composes conversational utterances that include the computer-generated text in response to the conversational text.

5. The storage subsystem of claim 1, wherein the control signal is received via a user interface.

6. The storage subsystem of claim 1, wherein the control signal comprises control phrases generated using an automated system.

7. The storage subsystem of claim 1, wherein the grounding source is a network-accessible grounding source, and wherein the grounding interface is configured to retrieve information from the grounding source via a network.

8. The storage subsystem of claim 1, wherein the machine learning model includes a transformer-based language model.

9. The storage subsystem of claim 1, wherein the machine learning model uses self-attention masked by one or more attention masks.

10. The storage subsystem of claim 1, wherein the inductive attention is a sparse attention in which an attention link is predetermined by structural information.

11. A storage subsystem holding instructions executable by a logic subsystem to instantiate a word processing application, the word processing application comprising:
    a user interface configured to receive an input text seed and a control signal;
    a machine learning model trained to output computer-generated text based on the input text seed;
    a grounding interface enabling the machine learning model to access a grounding source including grounding information related to the input text seed; and
    a control interface enabling the machine learning model to recognize the control signal;
    wherein the machine learning model uses inductive attention and incorporates focused grounding information relevant to the input text seed in the computer-generated text, the focused grounding information selected from the grounding information based on the control signal, and wherein the word processing application automatically writes and/or rewrites a document or message by incorporating the computer-generated text into the document or message.

12. The storage subsystem of claim 11, wherein the word processing application is configured to automatically write and/or rewrite the document by incorporating the computer-generated text into the document.

13. The storage subsystem of claim 11, wherein the word processing application is an email application configured to automatically write and/or rewrite an email message by incorporating the computer-generated text into the email message.

14. The storage subsystem of claim 11, wherein the user interface includes an audio-input interface and the input text seed is conversational text.

15. The storage subsystem of claim 11, wherein the user interface includes an audio-input interface and the control signal is conversational text.

16. The storage subsystem of claim 11, wherein the machine learning model includes a transformer-based language model.

17. The storage subsystem of claim 11, wherein the grounding source is a network-accessible grounding source, and wherein the grounding interface is configured to retrieve information from the grounding source via a network.

18. The storage subsystem of claim 11, wherein the machine learning model uses self-attention masked by one or more attention masks.

19. The storage subsystem of claim 11, wherein inductive attention is a sparse attention in which an attention link is predetermined by structural information.

20. A computer-implemented method performed by a machine learning model, the method comprising:
    receiving input text as input to the machine learning model;
    retrieving, via a grounding interface, grounding information related to the input text from a grounding source;
    receiving additional input text;
    recognizing, via a control interface, a control signal from the additional input text; and
    using inductive attention to output computer-generated text based on the input text, wherein the computer-generated text includes focused grounding information selected from the grounding information based on the control signal, and wherein a computer application automatically writes and/or rewrites a document or message by incorporating the computer-generated text into the document or message.

* * * * *